US 6,582,331 B1

(12) United States Patent
Baxter, Jr.

(10) Patent No.: US 6,582,331 B1
(45) Date of Patent: Jun. 24, 2003

(54) LUBRICATION SYSTEM FOR ENDLESS ELEMENT OF TRANSFER CASE

(75) Inventor: Ralph W. Baxter, Jr., Fort Wayne, IN (US)

(73) Assignee: Torque-Traction Technologies, Inc., Holland, OH (US)

( * ) Notice: Subject to any disclaimer, the term of this patent is extended or adjusted under 35 U.S.C. 154(b) by 0 days.

(21) Appl. No.: 09/542,475

(22) Filed: Apr. 4, 2000

(51) Int. Cl.⁷ .............................................. F16H 57/04
(52) U.S. Cl. ........................................................ 474/91
(58) Field of Search ..................... 474/45, 91; 184/15.1, 184/15.2, 6.12, 11.1; 74/606 A

(56) References Cited

U.S. PATENT DOCUMENTS

| | | | |
|---|---|---|---|
| 4,271,930 A | * 6/1981 | Thomson et al. | ......... 184/15 A |
| 4,367,661 A | 1/1983 | Moroto et al. | |
| 4,699,249 A | * 10/1987 | Fujiura et al. | ............. 184/11.1 |
| 4,719,815 A | 1/1988 | Sherman | |
| 4,738,159 A | 4/1988 | Kato et al. | |
| 5,088,346 A | 2/1992 | Hirabayashi et al. | |
| 5,511,448 A | 4/1996 | Kameda et al. | |
| 5,704,868 A | 1/1998 | Lindsey et al. | |
| 5,800,299 A | * 9/1998 | Lamers et al. | ................ 474/45 |

FOREIGN PATENT DOCUMENTS

JP          6-137408 A    *  5/1994    ............... 74/606 R

* cited by examiner

Primary Examiner—David A. Bucci
Assistant Examiner—Vicky A. Johnson
(74) Attorney, Agent, or Firm—Liniak, Berenato & White

(57) ABSTRACT

A lubrication arrangement for an endless chain in a transfer case of four-wheel drive vehicles comprising a casing, an input shaft, a first output shaft drivingly connected thereto, a second output shaft spaced from the input shaft, and the endless chain selectively transmitting torque from the first output shaft to the second output shaft. The casing includes a lubricant reservoir and a torque transfer compartment housing the endless chain. The input shaft is rotatably mounted within the casing and extends into the lubricant reservoir. An oil pump is arranged within the lubricant reservoir for supplying the lubricant under pressure to the endless chain. The excess amount of the lubricant is returned back to the lubricant reservoir through a lubricant return port formed in the casing. The lubrication arrangement allows retaining only a minimum necessary amount of lubricant in the chain compartment, thus preventing the oil churning and aeration.

16 Claims, 2 Drawing Sheets

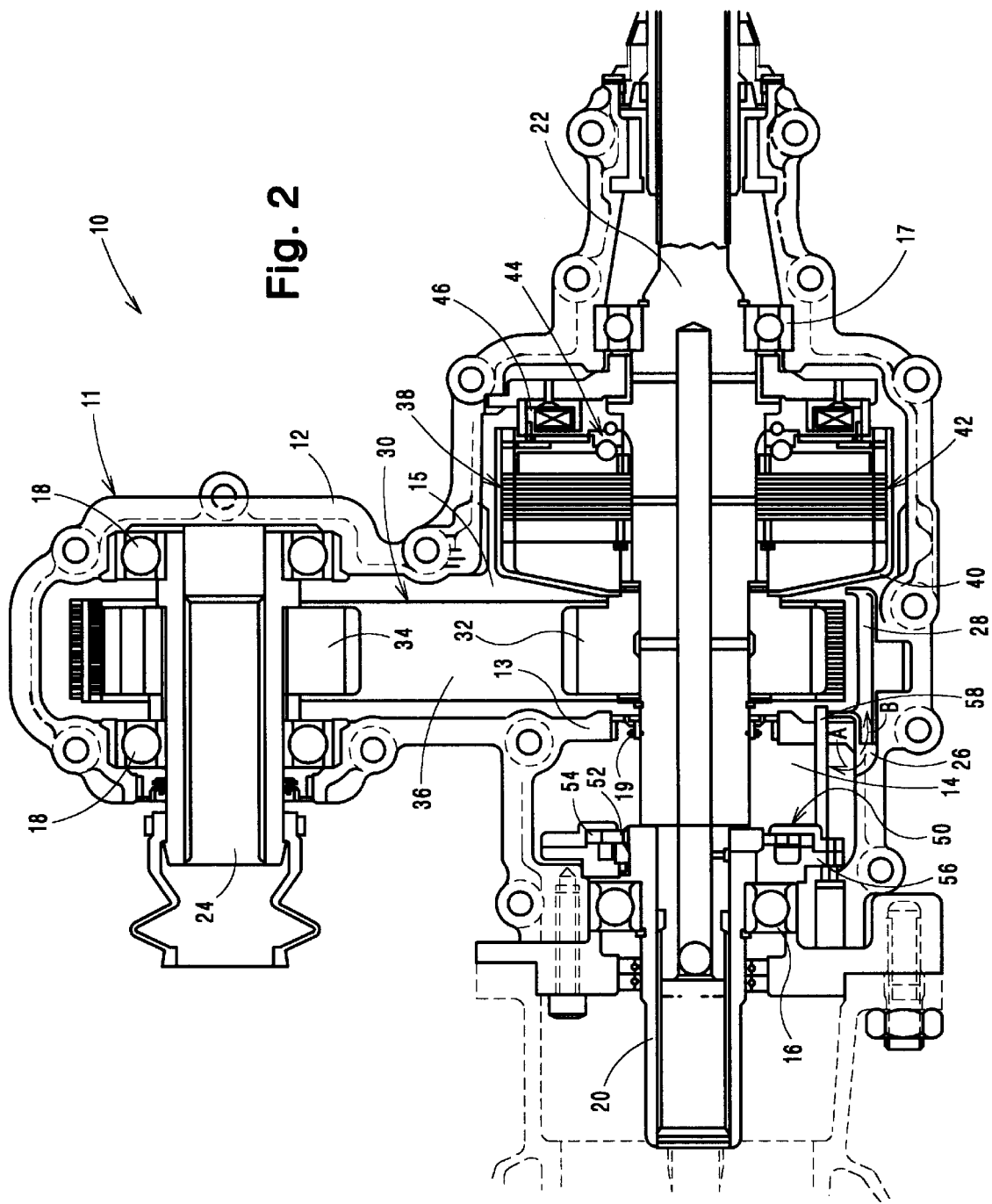

LUBRICATION SYSTEM FOR ENDLESS ELEMENT OF TRANSFER CASE

FIELD OF THE INVENTION

The present invention relates to transfer cases for four-wheel drive vehicles in general, and in particular, to a lubrication system for a chain of a transfer case provided with a dry sump chain reservoir.

BACKGROUND OF THE INVENTION

Transfer cases for four-wheel drive vehicles are well known in the prior art, and serve to transmit torque from an engine or prime mover to a plurality of drive axles to thereby drive front and rear axles of a motor vehicle. Typically, the transfer case includes an input shaft driven by a vehicle transmission, two output shafts driving front and rear axles and an endless chain element transmitting input torque to the output shaft driving front wheels in a four-wheel drive mode. The transfer case is usually mounted behind and is driven by a transmission. Two shafts normally run from the transfer case: one to the front drive axle and one to the rear drive axle.

Usually, the torque transmitting chain is housed in a common compartment defined by a transfer case casing. The casing is typically provided with an oil bath where the chain is partially immersed. The chain, rotating all the time the vehicle transmission is driven, constantly aerates and churns the lubrication oil that substantially raises the oil temperature, especially at high speeds, thus, significantly deteriorating the quality of oil and reducing the service life of the oil and the transfer case.

SUMMARY OF THE INVENTION

The present invention alleviates the drawbacks of the prior art. The present invention provides a transfer case for a four-wheel drive vehicle including a casing having a partition wall defining two separate fluidly isolated compartments: a lubricant reservoir and a torque transfer compartment. The torque transfer compartment houses a chain transmitting power from a driving sprocket to a driven sprocket, and the lubricant reservoir contains an appropriate predetermined amount of the lubricant. While the lubricant reservoir is provided with an oil bath, the torque-transfer compartment is virtually dry and fluidly isolated from the lubricant in the lubricant reservoir by the partition wall and a seal member. In order to provide the needed lubrication, a lubricant dispenser is employed that provides a necessary amount of oil in a chain sprocket area. The motion of the chain throws the excess oil out of the torque-transfer compartment back onto the lubricant reservoir so that only a small amount of oil would be in the torque-transfer compartment. Therefore, the aeration and churning of the oil is prevented and the temperature of the lubrication oil is reduced.

BRIEF DESCRIPTION OF THE DRAWINGS

Other objects and advantages of the invention will become apparent from a study of the following specification when viewed in light of the accompanying drawings, wherein:

FIG. 2 is a sectional view of a transfer case in accordance with the preferred embodiment of the present invention.

DETAILED DESCRIPTION OF PREFERRED EMBODIMENT

Figure 1:
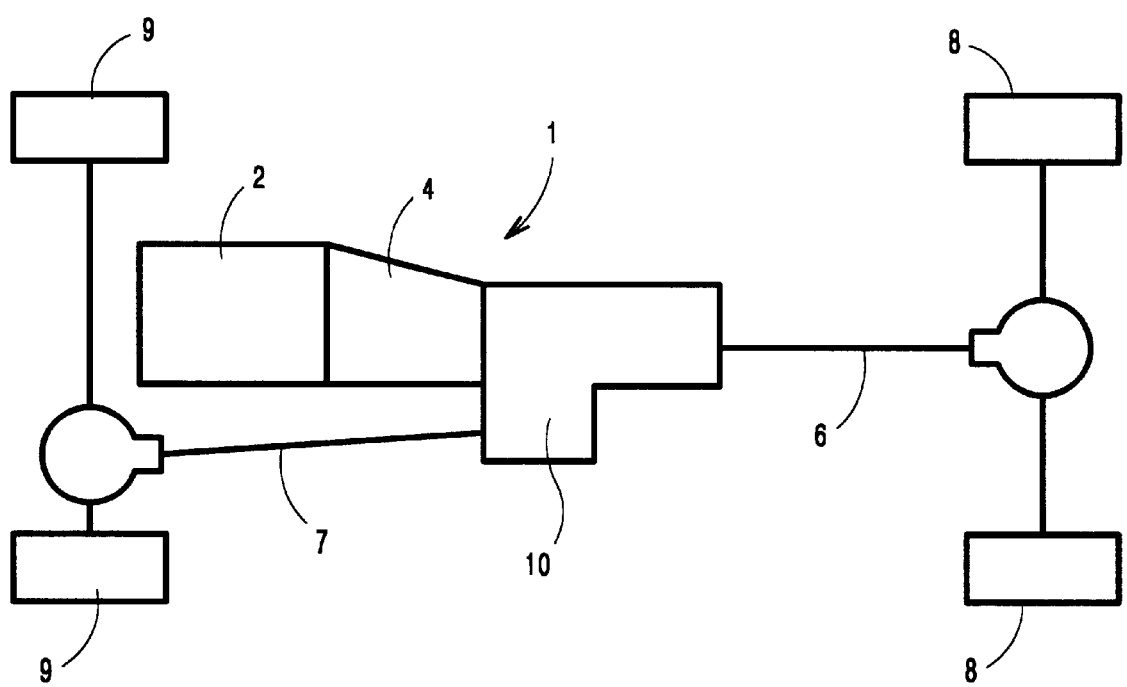
FIG. 1 is a schematic diagram showing a drivetrain of a four-wheel-drive vehicle.

Referring now to the FIG. 1, a lubrication system in accordance with the present invention is utilized in a four-wheel-drive (FWD) vehicle 1. The vehicle 1 comprises an engine 2, a multi-speed change gear mechanism 4, and a four-wheel-drive transfer case 10. The transfer case 10 is coupled to the multi-speed change gear mechanism 4, which, in turn, is coupled to the engine 2. The transfer case 10 is connected to a propeller shaft 6 for driving rear wheels 8 of the vehicle 1, and to a propeller shaft 7 for driving front wheels 9 of the vehicle 1.

The FIG. 2 illustrates a sectional view of the transfer case 10 of the four-wheel-drive vehicle to which the lubrication system for a power transmission chain in accordance with the present invention is applied. Such transfer cases usually offer "on-demand" four-wheel-drive, providing rear or front wheel drive (two-wheel-drive mode), or four wheel drive (four-wheel-drive mode), controlled automatically or by a vehicle operator.

The transfer case 10 includes a casing 11 having a continuous outer wall 12 forming a transfer case compartment divided by a partition wall 13 and a seal 19 into a lubricant reservoir 14 and a torque transfer compartment 15. The lubricant reservoir 14 is adapted to store an appropriate predetermined amount of a lubricant, such as transmission oil, while the torque transfer compartment 15 contains no substantial amount of lubricant. An input shaft 20 drivingly connected to an output shaft (not shown) of the multi-speed change gear mechanism 4, is rotatably mounted in the wall 12 of the casing 11 by a bearing assembly 16. A first output shaft 22 is provided for driving the rear wheels 8 of the FWD vehicle 1, and is rotatably mounted in the wall 12 of the casing 11 by a bearing assembly 17. The first output shaft 22 is axially aligned with the input shaft 20 and positively connected thereto by any appropriate means well known in the art, such as a spline connection. A second output shaft 24 is provided for driving the front wheels 9 of the FWD vehicle 1, and is rotatably mounted in the wall 12 of the casing 11 by a pair of bearing assemblies 18. The second output shaft 24 of the transfer case 10 is disposed parallel to the first output shaft 22.

A torque transfer mechanism 30, disposed in the torque transfer compartment 15, is provided to selectively transfer drive torque from the first output shaft 22 to the second output shaft 24. The torque transfer mechanism 30 comprises a first transmission wheel or drive sprocket 32 rotatably mounted about the first output shaft 22, a second transmission wheel or driven sprocket 34 secured about the second output shaft 24, an endless torque-transfer element, preferably a chain 36, interconnecting the drive and driven sprockets 32 and 34 respectively, and a clutch device 38 for engagement and disengagement of the driven sprocket 34 and the first output shaft 22. Thus, the clutch device 38 defines a two-wheel-drive (2WD)—four-wheel-drive (4WD) control mechanism for selecting an engine torque distribution between the front and rear wheels.

In the preferred embodiment, the clutch device 38 is a conventional wet-type multiple disc friction clutch, well known in the prior art. However, it would be appreciated that other types of clutch devices well known to those skilled in the art, such as positive engagement clutches, a cone friction clutch, etc., are within the scope of the present invention.

The multiple disc friction clutch 38 includes a clutch drum 40 fixedly attached to the drive sprocket 32, and a friction disc clutch pack 42 encased within the drum 40. The friction disc clutch pack 42 includes a plurality of alternating friction discs splined with the clutch drum 40 and the first output shaft 22. In the preferred embodiment, illustrated in FIG. 2, a ball-ramp actuator 44 and an electromagnet 46 controlling the ball-ramp actuator 44 are employed. However, other types of multiple disc friction clutch actuators, such as hydraulic or pneumatic, are also within the scope of the present invention.

The lubrication system of the present invention includes an oil pump assembly 50 driven by the input shaft 20 and mounted in the lubricant reservoir 14. Preferably, the oil pump assembly 50 is mounted about the inlet shaft 20. In the preferred embodiment of the present invention, the oil pump assembly 50 is of a gerotor type. However, other appropriate types of the oil pump may be employed, such as gear, piston or vane type pumps. As illustrated in FIG. 2, a driving gear 52 is secured to the inlet shaft 20, preferably by a spline connection. Reference numeral 54 is a driven gear, and 56 is a pump body.

Alternatively, the oil pump assembly 50 may be driven by the first output shaft 22 and mounted thereabout.

The oil pump 50 is supplied with the lubricant through an inlet side thereof. An outlet port of the oil pump 50 is in fluid communication with a lubricant dispensing member adapted to spray the lubricant under pressure onto the chain 36. In the preferred embodiment of the present invention, the lubricant dispensing member is in the form of an elongated lubricant dispensing pipe 58 extending from the oil pump 50 through the partition wall 13 to the torque transfer compartment 15. The dispensing pipe 58 is secured at one end to the body 56 of the pump 50. The other end of the dispensing pipe 58 is located in the torque-transfer compartment 15 adjacent to the drive sprocket 32. In operation, the lubricant discharged from the outlet port of the pump 50, is sprayed from the dispensing pipe 58 onto the chain 36 near the drive sprocket 32 to lubricate torque transfer mechanism 30. It would be appreciated that the other end of the dispensing pipe 58 may be provided with a nozzle (not shown) in order to enhance the stream of the sprayed lubricant.

Furthermore, the lubrication system is provided with a return port 26 formed in the casing 11 by casting or drilling, for returning lubricant splashed by the movement of the chain 36 back to the lubricant reservoir 14. The return port 26 provides a one-way fluid communication passage between the lubricant reservoir 14 and the torque-transfer compartment 15, i.e. the excess lubricant in the torque-transfer compartment 15 could return to the lubricant reservoir 14 by gravity through the return port 26 in a first direction (A), however, the lubricant from the lubricant reservoir 14 could not enter the torque-transfer compartment 15 through the return port 26 in a second direction (B). This is achieved by the structural arrangement of the casing 11 wherein the level of lubricant in the lubricant reservoir 14 is lower than an opening in the port 26 in the torque-transfer compartment 15.

Moreover, in order to facilitate the return of the excess lubricant back into the lubricant reservoir 14, a lubricant catcher 28 is provided in the torque-transfer compartment 15 adjacent to the return port 26. The lubricant catcher 28 facilitates the return of the excess lubricant back into the lubricant reservoir 14 by diverting the lubricant splashed by the movement of the chain 36 into the return port 26.

The preferred embodiment of the present invention described a conventional layout of the vehicular transfer case where the input shaft is coaxial with the first output shaft and the second output shaft is spaced from the input shaft. However, the present invention is also applicable to the alternative layout of the vehicular transfer case where both output shafts are spaced from the input shaft.

The foregoing description of the preferred embodiment of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiment disclosed herein above was chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A transfer case for a four-wheel drive vehicle, comprising:

a casing defining a lubricant reservoir containing a predetermined amount of a lubricant and a substantially dry torque transfer compartment;

an input shaft rotatably mounted within said casing and extending into said lubricant reservoir;

a first output shaft rotatably mounted within said casing and drivingly connected to said input shaft;

a second output shaft rotatably mounted within said casing and spaced from said first output shaft;

an endless element transmitting torque from said input shaft to at least one of said output shafts, said endless element disposed in said torque transfer compartment; and a lubrication means for lubricating said endless element by supplying the lubricant from said lubricant reservoir to said endless element.

2. The transfer case for a four-wheel drive vehicle as defined in claim 1, wherein said lubrication means including an oil pump for supplying the lubricant under pressure from said lubricant reservoir to said endless element.

3. The transfer case for a four-wheel drive vehicle as defined in claim 2, wherein said oil pump being disposed in said lubricant reservoir.

4. The transfer case for a four-wheel drive vehicle as defined in claim 3, wherein said oil pump being mounted on said input shaft and permanently drivingly connected thereto.

5. The transfer case for a four-wheel drive vehicle as defined in claim 1, wherein said lubrication means including a lubricant dispensing member for dispensing the lubricant onto said endless element.

6. The transfer case for a four-wheel drive vehicle as defined in claim 1, wherein said casing including a lubricant return port for returning lubricant splashed by the movement of said endless element from said torque transfer compartment to said lubricant reservoir.

7. The transfer case for a four-wheel drive vehicle as defined in claim 6, further comprising a lubricant catcher for guiding the excess lubricant splashed by the movement of said endless element to said lubricant return port, said lubricant catcher disposed in said torque transfer compartment adjacent to said lubricant return port.

8. A transfer case for a four-wheel drive vehicle, comprising:

a casing defining a lubricant reservoir containing a predetermined amount of a lubricant and a substantially dry torque transfer compartment;

an input shaft rotatably mounted within said casing and extending into said lubricant reservoir;

a first output shaft rotatably mounted within said casing and drivingly connected to said input shaft;

a second output shaft rotatably mounted within said casing and spaced from said input shaft;

a torque transfer mechanism disposed in said torque transfer compartment, said torque transfer mechanism including:
- a first transmission wheel mounted about said first output shaft,
- a second transmission wheel drivingly connected to said second output shaft, and
- an endless element transmitting torque from said first transmission wheel to said second transmission wheel, and a lubrication means for lubricating said endless element by supplying the lubricant from said lubricant reservoir to said endless element.

9. The transfer case for a four-wheel drive vehicle as defined in claim 8, wherein said torque transfer mechanism further comprising a coupling means for selectively connecting said first transmission wheel to said first output shaft.

10. The transfer case for a four-wheel drive vehicle as defined in claim 8, wherein said lubrication means including an oil pump for supplying the lubricant under pressure from said lubricant reservoir to said endless element.

11. The transfer case for a four-wheel drive vehicle as defined in claim 10, wherein said oil pump being disposed in said lubricant reservoir.

12. The transfer case for a four-wheel drive vehicle as defined in claim 11, wherein said oil pump being mounted on said input shaft and permanently drivingly connected thereto.

13. The transfer case for a four-wheel drive vehicle as defined in claim 8, wherein said lubrication means including a lubricant dispensing member for dispensing the lubricant onto said endless element.

14. The transfer case for a four-wheel drive vehicle as defined in claim 8, wherein said casing including a lubricant return port for returning lubricant splashed by the movement of said endless element from said torque transfer compartment to said lubricant reservoir.

15. The transfer case for a four-wheel drive vehicle as defined in claim 14, further comprising a lubricant catcher for guiding the excess lubricant splashed by the movement of said endless element to said lubricant return port, said lubricant catcher disposed in said torque transfer compartment adjacent to said lubricant return port.

16. A transfer case for a four-wheel drive vehicle, comprising:

a casing defining a lubricant reservoir and a substantially dry torque transfer compartment;

an input shaft rotatably mounted within said casing and extending into said lubricant reservoir;

a first output shaft rotatably mounted within said casing and arranged coaxially with said input shaft, said first output shaft being drivingly connected to said input shaft;

a second output shaft rotatably mounted within said casing and spaced from said first output shaft;

a torque transfer mechanism disposed in said torque transfer compartment, said torque transfer mechanism including:
- a drive sprocket disposed about said first output shaft;
- a driven sprocket drivingly connected to said second output shaft;
- a clutch assembly for selectively connecting said drive sprocket to said first output shaft, and
- an endless chain transmitting torque from said drive sprocket to said driven sprocket;

an oil pump assembly arranged within said lubricant reservoir for supplying the lubricant under pressure from said lubricant reservoir to said endless chain, said oil pump assembly being mounted on said input shaft and permanently drivingly connected thereto;

a lubricant dispensing pipe for supplying the lubricant from said lubricant reservoir onto said endless chain, said lubricant dispensing pipe extending from said lubricant reservoir to said torque transfer compartment, said dispensing pipe being connected to said pump assembly at one end and terminated in the proximity of said endless chain at the other end;

a lubricant return port formed in said casing for returning the lubricant driven by the movement of said endless chain from said torque transfer compartment to said lubricant reservoir, and an oil catcher disposed in said torque transfer compartment to direct the excess lubricant to said lubricant return port.

* * * * *